W. M. PESTEL.
ANALYTICAL BALANCE AND THE LIKE.
APPLICATION FILED FEB. 24, 1920.

1,387,998.

Patented Aug. 16, 1921.
2 SHEETS—SHEET 1.

Inventor:
William M. Pestel
by
Attys.

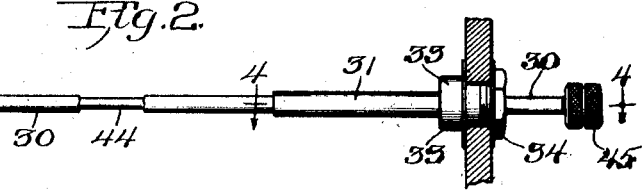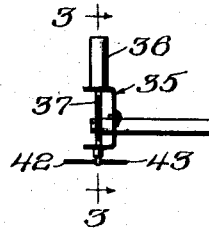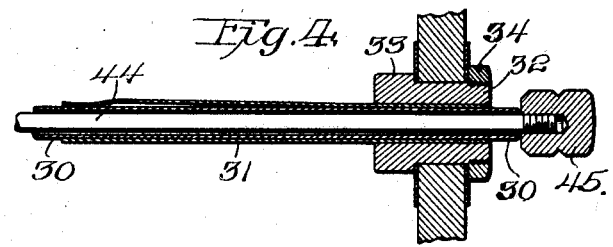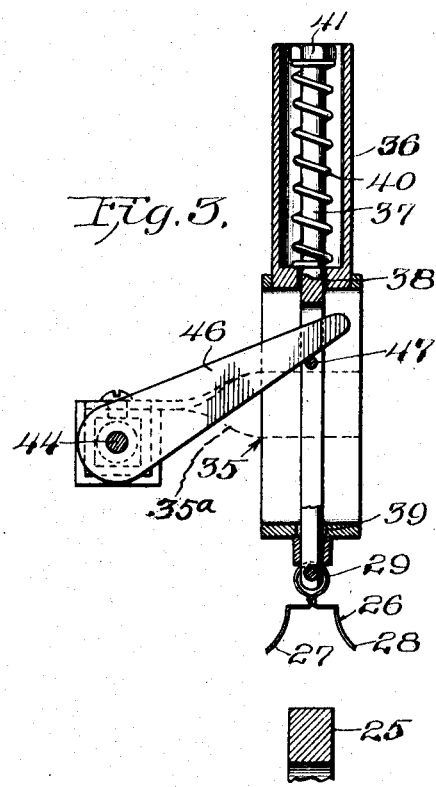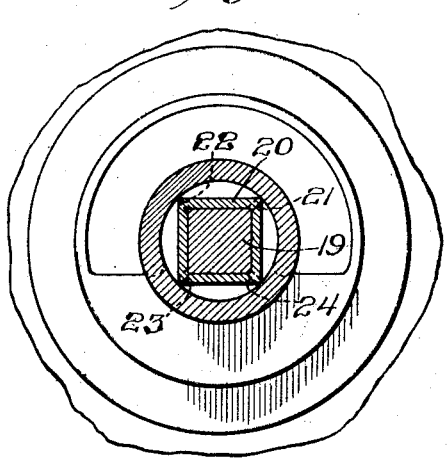

UNITED STATES PATENT OFFICE.

WILLIAM M. PESTEL, OF CHICAGO, ILLINOIS, ASSIGNOR TO SCHAAR & COMPANY, OF CHICAGO, ILLINOIS, A CORPORATION OF ILLINOIS.

ANALYTICAL BALANCE AND THE LIKE.

1,387,998.  Specification of Letters Patent.  Patented Aug. 16, 1921.

Application filed February 24, 1920. Serial No. 360,665.

*To all whom it may concern:*

Be it known that I, WILLIAM M. PESTEL, a citizen of the United States, residing at Chicago, county of Cook, and State of Illinois, have invented certain new and useful Improvements in Analytical Balances and the like, of which the following is a specification.

The present invention has to do with certain improvements in balances for comparing weights or weighing articles. The invention has particular reference to improvements in analytical balances such as are used for the accurate weighing of chemicals and other analytical work.

In balances of this type, it is very common to make use of what is known as a "rider" which may be set at different points on the balance beam, the rider being itself of light weight, and being used for securing the final accurate adjustment of the balance. In order to make it possible to secure the most accurate results, it is essential that means should be provided for the adjustment of the rider back and forth on the balance beam without undue disturbance to the beam itself. In this connection it should be possible to raise the rider from the beam and set it onto the beam at another point without disturbing the beam itself and in such a manner that severe oscillations or swings of the beam will not be occasioned.

One of the objects of the present invention is to provide an improved type of balance and improved device for adjusting the position of the rider along the beam with the least possible disturbance to the balance itself.

Another feature of the invention relates to the manner in which the vertical post which carries the balance parts is supported within the frame of the apparatus so as to prevent the balance beam and associated parts from swinging about a vertical axis. In this connection one of the objects of the invention is to greatly simplify the construction of these parts so as to prevent such swinging motion; and also to so arrange the parts that the necessary amount of friction or pressure will at all times be brought to bear on the post so as to secure a smooth and even operation in the adjustment of the balance post.

Other objects and uses of the invention will appear from a detailed description of the same which consists in the features of construction and combinations of parts hereinafter described and claimed.

In the drawings:

Fig. 2 shows a detail assembly view of the rider adjustment mechanism;

Fig. 3 shows a greatly enlarged detail section taken on the line 3—3 of Fig. 2, looking in the direction of the arrows;

Fig. 4 shows an enlarged detail section taken on the line 4—4 of Fig. 2, looking in the direction of the arrows; and Fig. 5 shows a greatly enlarged detail section taken on the line 5—5 of Fig. 1, looking in the direction of the arrows.

Figure 1:
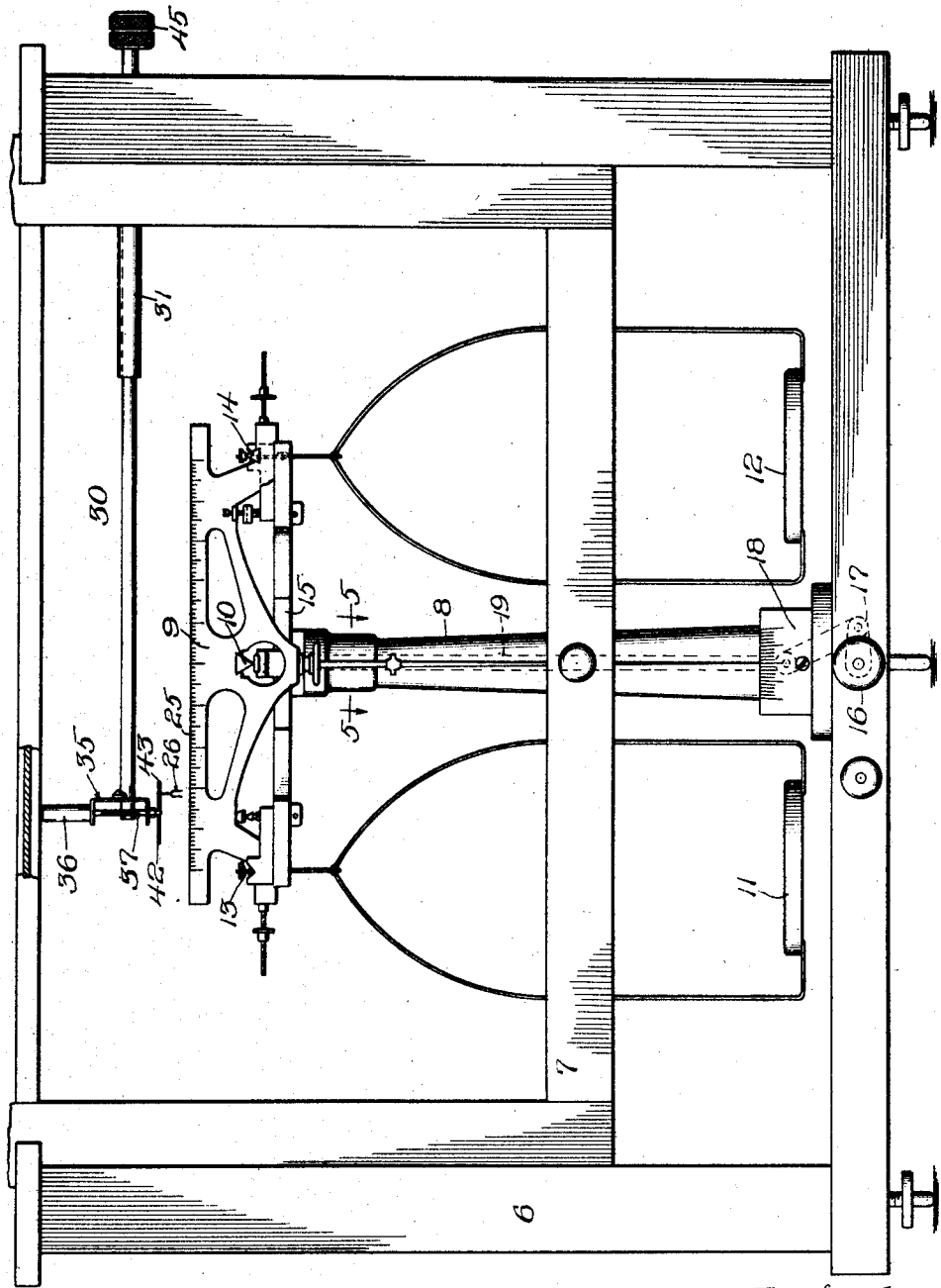
Figure 1 shows a front face view of an analytical balance embodying the features of the present invention, the same being incased or mounted within a glass chamber of familiar type.

I will first state that I have in the drawings illustrated a simple type of analytical balance, the same being inclosed within a draft proof chamber 6 having the vertical sliding doors 7 of familiar form. The balance includes the vertical frame post 8 on the upper portion of which is mounted the balance beam 9, by means of knife edges 10 of familiar construction. The pans 11 and 12 are supported from the ends of the beam by familiar knife edge supports 13 and 14. A vertically adjustable beam 15 is provided beneath the balance beam and beneath the knife edge supports 13 and 14, so that by raising the beam 15 the loads of the various parts may be taken off the knife edges.

The raising of the beam 15 is effected through the medium of a handle or milled head 16, crank 17, link 18, and post 19. Upon turning the milled head 16 in a counter-clockwise direction, the post 19 is raised so as to raise the cross beam 15.

It is very customary in balances of this type to provide a pin and slot arrangement for preventing the rotation of the post 19 as the same is adjusted up and down. In the present case I have provided an improved construction of parts for preventing the rotation of the post 19 which I will now explain in detail. For this purpose, reference may be had particularly to Fig. 5 wherein it will be observed that the post 19 is square or at any rate angular in cross section. Its upper end is surrounded by a sleeve 20 of similar contour, said sleeve in the present case being rectangular in form; and said sleeve extends down along the post a sufficient distance to engage the post in a substantial manner. The upper end of the sleeve is suitably supported on the pedestal 8, and the lower portions of the sleeve are split in their corners as at 21, 22, 23, and 24 so as to provide in effect four blades or fingers embracing the four surfaces of the post 19 in a substantial manner. By this construction it will be observed that not only is the post held against rotation without the provision of special means for this purpose, but also a desired amount of friction is created by the post so as to insure a smooth operation in moving the post up and down by means of the milled head 16.

The upper edge 25 of the balance beam 9 is graduated, and is adapted to receive riders which may be set back and forth. I will now explain the construction of these riders, and the means whereby they may be very delicately adjusted, or removed from or seated upon the rider beam itself. Each of the riders comprises a section of light wire 26, as shown in Fig. 3, having a pair of depending arms 27 and 28, and the central loop portion 29. Above the balance beam there is provided a horizontally extending adjustment rod 30 which may be slid back and forth in a horizontal direction and above the beam. For this purpose, the rod 30 is slidably mounted within a short section of tubing 31 which, in turn, is carried in a block 32 having a flange 33 adapted to seat against one wall of the chamber 6, and a nut 34 is adapted to clamp against the outside face of the same wall. The tube 31 is of sufficient length to give an adequate support to the rod 30 while at the same time providing substantially a dust-tight mounting for said rod.

On the inner end of the rod 30 there is mounted a head member 35. The head member 35 is connected to the hollow rod 30 by means of a bracket 35ª which extends sidewise from the end portion of said hollow rod, as clearly indicated in Fig. 3. In its upper portion this head member 35 is provided with a spring chamber 36; and a pin 37 is vertically movable in the head member, as will appear from the detailed view shown in Fig. 3. One end of the pin 37 is journaled in the head member at the point 38, and the other end of the pin is journaled at the point 39. A spring 40 acts between a nut 41 on the upper end of the pin 37 and the floor of the spring chamber tending to raise the pin into the position of Fig. 3.

On its lower end the pin 37 carries a cross pin having the fingers 42 and 43 either of which may be used for supporting the rider by engaging the loop 29 thereof in the manner clearly evident in Fig. 3.

The pin 37 normally stands in the raised position of Fig. 3, and in such position the cross pins 42 and 43 are so high up that they will either clear any riders resting on the balance beam 9 or will sustain the riders entirely clear of said balance beam. I have provided means for lowering the pin 37 at the convenience of the operator. Such means in the present case is as follows: The rod 30 is made hollow and constitutes in effect a tube, and another rod 44 extends therethrough. The outer end of said rod 44 carries a milled head 45 by means of which it may be manipulated; and the inner end of the rod carries a finger 46 which normally engages a cross pin 47 on the pin 37. The arrangement is such that upon turning the milled head 45, the rod 44 is rocked so as to lower the pin 37. Thereupon the rod 44 and tubular rod 30 may be moved back and forth so as to either engage a rider already seated on the beam, or so as to position the rider at the desired point above the beam preparatory to seating it thereon.

It will be observed that the construction of rider adjustment herein explained is such that all of the manipulations of the rider may be effected without having to open up the case in which the balance is contained, and the arrangement is also such that the riders can be very accurately positioned and be very delicately manipulated.

I claim:

1. The combination with an analytical balance having in its upper portion a horizontally extending rider beam, and an inclosing casing for said balance, of a rider carriage for said beam, said rider carriage comprising a sleeve secured in the side wall of the casing at a point of greater elevation than the rider beam, a tube rotatably and slidably mounted within said sleeve, and having its inner end within said casing above the rider beam and having its outer end outside of the casing, and provided with a suitable head member secured to the inner end of said tube above the rider beam, a vertically arranged plunger slidably mounted in said head member, a horizontal pin on the lower end of said plunger, a spring in the head member normally raising the plunger and pin, a rod extending through the sleeve aforesaid, and having its outer end outside of the casing and provided with an operating finger piece, and a rocking connection between the inner end of said rod and plunger whereby when the rod is rocked by rotation of the finger piece, the plunger is depressed to carry its cross pin into close proximity to the rider beam, substantially as described.

2. The combination with an analytical balance having in its upper portion a horizontally extending rider beam, and an inclosing casing for said balance, of a rider carriage for said rider beam comprising a tubular member slidably supported with respect to the casing and having its inner portion located above and parallel to the rider beam and its outer end outside of the casing, an operating head on the inner end of said tube, a vertically arranged plunger movably mounted within said operating head, a horizontal pin on the lower end of said plunger, a spring normally raising the plunger and pin with respect to the operating head whereby the pin is normally raised above the rider beam, a rod rotatably mounted within the tube aforesaid, an operating head on the outer end of said rod, and an operating connection between the inner end of said rod and plunger whereby when the rod is rocked by manipulation of its outer end, the plunger and pin are moved downwardly into close proximity to the rider beam against the force of the spring aforesaid, substantially as described.

3. The combination with an analytical balance having in its upper portion a horizontally extending rider beam, and a casing for said balance, of a tubular member extending in horizontal fashion above the rider beam and slidably mounted with respect to the casing, and the outer end of said tubular member extending to the outside of the casing, an operating head on the inner end of said tubular member, a vertically arranged plunger movably mounted with respect to said operating head, a rider pin on the lower end of said plunger, a rod rotatably mounted within the tubular member aforesaid, an operating head on the outer end of said rod, and an operating connection between the inner end of the rod and the plunger aforesaid whereby as the operating head is manipulated, the rod may be rocked to move the plunger and pin toward the rider beam, substantially as described.

4. The combination with an analytical balance having in its upper portion a horizontally extending rider beam, and a casing for said balance, of a rider carriage comprising a horizontally extending member located above the rider beam and extending through the casing to the outside thereof, and slidably mounted with respect to the casing, an operating head on the inner end of said member, a vertically arranged plunger movably mounted in said operating head, a pin on the lower end of said plunger, a rod movable in conjunction with said horizontally extending member, an operating member on the outside end of said rod, and an operating connection between the inner end of said rod and the plunger whereby when the rod is manipulated, the plunger is moved with respect to the rider beam, substantially as described.

5. The combination with an analytical balance having in its upper portion a rider beam, and a casing for said balance, of a horizontally extending member movably mounted in the casing adjacent to the rider beam, said member projecting to the outside of the casing, a plunger movable with respect to the inner end of said member, and means in conjunction with the member whereby the plunger may be moved toward and from the rider beam, substantially as described.

WILLIAM M. PESTEL.